United States Patent

[11] 3,552,333

| [72] | Inventor | Otto Salamon |
| | | Zurich, Switzerland |
| [21] | Appl. No. | 778,098 |
| [22] | Filed | Nov. 22, 1968 |
| [45] | Patented | Jan. 5, 1971 |
| [73] | Assignee | Von Roll AG, |
| | | Gerlafingen, Switzerland |
| | | a corporation of Switzerland |
| [32] | Priority | July 8, 1968 |
| [33] | | Switzerland |
| [31] | | 10,154/68 |

[54] PROCESS FOR THE CONCOMITANT INCINERATION OF SOLID REFUSE AND OF AQUEOUS SEWAGE SLUDGE
11 Claims, 3 Drawing Figs.

[52] U.S. Cl. ............................................. 110/8, 110/15
[51] Int. Cl. ............................................. F23g 5/00
[50] Field of Search ............................................. 110/7, 8, 10, 15, 18; 210/9, 63

[56] References Cited
UNITED STATES PATENTS

| 1,892,681 | 1/1933 | Rankin | 110/8UX |
| 2,045,115 | 6/1936 | Allen et al. | 110/15 |
| 3,319,586 | 5/1967 | Albertson et al. | 110/8 |

Primary Examiner—Kenneth W. Sprague
Attorney—Werner W. Kleeman

ABSTRACT: A novel process is disclosed for the concomitant incineration of solid refuse and of aqueous sewage sludge. The process utilizes thermal dewatering of the sludge prior to its incineration by means of heat resulting from the incineration of the solid refuse, the dried sludge then being added to the solid refuse and burnt together. Any malodorous gases or vapors produced are reconducted into the combustion chamber of the incinerator utilized whereby odorless operation is ensured. Various operational layouts for carrying out the novel process are also described herein.

INVENTOR
Otto Salamon
BY Jacobi & Davidson
ATTORNEY

3,552,333

PROCESS FOR THE CONCOMITANT INCINERATION OF SOLID REFUSE AND OF AQUEOUS SEWAGE SLUDGE

BACKGROUND OF THE INVENTION

One of the problems of modern day living in the civilized countries concerns the disposal of the great and steadily increasing amount of refuse of differing varieties. Such refuse comprises household garbage, street sweepings, packaging paper and cardboard, wood, plastics and rubber, garden foliage, junk and rubbish, refuse from workshops and the like and, furthermore, putrid and malodorous sludge from community sewage treatment plants. For obvious social hygiene and esthetic reasons, all of this unpleasant refuse must be disposed of. Dumping or land-fill operations to this effect are not entirely suitable due to the danger of air and ground water pollution thereby entailed and further due to the gradual decrease to be expected in the amount of available open land. Thus, the solution to the refuse problem appears to lie in the total destruction of the noxious material.

In this regard, various processes have been devised and are practiced, among which incineration of the refuse has proved to be the most suitable from a hygienic as well as from an economic standpoint. However, whereas for the incineration of solid refuse, a variety of proven processes and plants have been developed and are presently available, no such process has yet been fully satisfactory in the destruction of sewage sludge. This is due mainly to the fact that, in its initial stage, sewage sludge is a very aqueous suspension of both solid and putrid matter. Before a combustion of the putrid matter or, more precisely, of the organic and combustible materials therein contained may take place, the sewage sludge has to be dewatered to complete dryness. Dewatering processes of various types have again been devised in the prior art, such processes using mechanical, thermal, and chemical means. Such processes, however, are quire costly from either or both the initial cost and operational cost standpoints.

In circumstances wherein both solid refuse and sewage sludge may be or may have to be incinerated on the same site, an obvious and advantageous technique is to utilize the heat of combustion from the incineration of the solid refuse for the thermal dewatering of the sewage sludge by vaporizing the water therein contained.

In this regard, it would be helpful to technically analyze the various heating parameters relevant to the combustion of solid refuse and/or sewage sludge. Thus, in the following, the so-called equivalent amounts of solid refuse and sewage sludge will be taken into consideration, i.e., the amounts of both refuse types resulting from the same number of inhabitants during the same period of time. Furthermore, and with respect to sewage sludge, an initial water content of 92 percent will be assumed as is most generally the case with discharge from thickeners utilized in modern sewage treatment plants. The figures given hereinbelow for these amounts are pertinent not only as to present conditions but also have been projected for the near future.

The amount of solid refuse by inhabitant per day (per caput et dies=pcd) is between 1.5 and 4.5 pounds, the calorific value ranging from 1800 to 4500 BTU/LBS. The heat of combustion developed during incineration of such solid refuse lies within the range of 2800 to 20,000 BTU/pcd. However, only some 60 percent of this heat is actually available for useful purposes, i.e., some 1700 to 12,000 BTU/pcd, since, for reasons well known, the exhaust temperature of the flue gases from the incinerator must be kept above some 570° F.

The amount of sewage sludge at 92 percent water content is generally of some 2.2 to 4.4 LBS/pcd. With a figure of 1260 BTU in mind, this figure representing the heat for the vaporization of one pound of water and the subsequent super-heating of the resulting vapor to the above-mentioned temperature of 570° F, the amount of heat necessary for drying the equivalent quantity of sewage sludge comes to 2600 to 5200 BTU/pcd, which amount may be reduced to only 2000 to 4600 BTU/pcd when taking into consideration the calorific value of the dried sludge which is normally burnt together with the solid refuse.

The calculations given above clearly show that from a mixture of solid refuse and liquid sewage sludge, if such a mixture were at all possible and feasible under operational conditions, would result in a fuel of very low calorific value which would scarcely be capable of self-supporting combustion and which, in any case, would attain combustion temperatures so low that unpleasant odors would persist contrary to the primary requirement of hygienic incineration and the prevention of air pollution.

On the other hand, the calculations given above indicate that the available heat of combustion from the solid refuse is sufficient to dry an equivalent amount of sewage sludge, although in extreme cases additional fuel, such as oil, may be needed. Such cases may occur with solid refuse that is extremely wet or when the solid refuse is in short supply such as would be the case during weekends.

SUMMARY OF THE INVENTION

Considering the above discussion concerning the background of the instant invention, and further bearing in mind the objectives of developing an incineration process that is both hygienic as well as economical, the instant invention contemplates a novel process for the concomitant incineration of both solid refuse and sewage sludge wherein the thermal dewatering of the sewage sludge is carried out in suitable, convenient equipment in a separate manner from the incineration of the solid refuse together with the dried sludge, the equipment generally comprising a vaporizer of known construction e.g. a thin layer- vaporizer and a drum vaporizer or volute vaporizer of different construction with its design and function adapted to deal with suspension of particulate solid matters. The heat required for the thermal dewatering process is provided by the incineration of the solid refuse and dried sludge in furnaces also of known design and function.

In accordance with the instant invention, hot flue gases from the incinerator, or alternatively, steam generated in a boiler heated by the flue gases, are used as an intermediate thermal agent for the transfer of heat from the incinerator to the vaporizer. Furthermore, and also in accordance with the invention contemplated herein, single-stage or multistage vaporizers may be utilized for increasing the vaporizing capacity or for reducing the steam consumption.

BRIEF DESCRIPTION OF THE DRAWINGS

The subject inventive process will be better understood and objects, advantages, and features thereof not specifically set forth above will become apparent from the following detailed description of the process and the schematic flow sheets and representations of operational layouts depicted in the appended drawings, wherein.

In the various figures of the drawings, the flow of flue gases is represented by double lines (===), the flow of steam, both primary and secondary, by interrupted lines (− − −), the flow of liquid sewage sludge by continuous lines (————), and the flow of condensate by mixed lines (−.−.−).

DETAILED DESCRIPTION OF THE INVENTIVE EMBODIMENTS

Figure 1:
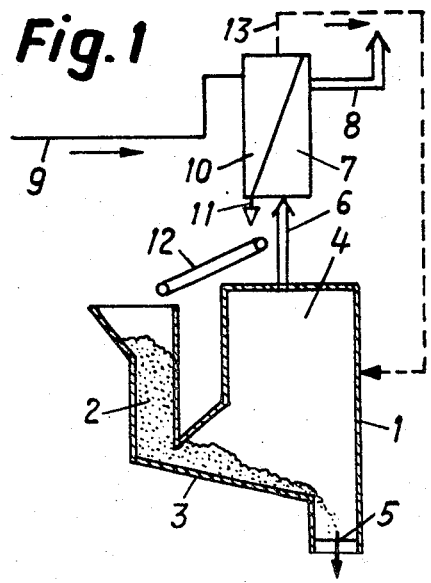
FIG. 1 illustrates an operational layout for carrying out the inventive process wherein the hot flue gases from an incinerator are used as an intermediate thermal agent to directly provide heat to a one-stage vaporizer for the liquid sewage sludge.

Referring now to FIG. 1, an incinerator for solid refuse is designated by reference numeral 1 and is seen to comprise, in the usual fashion, a charging pit 2, a combustion grate 3, which generally is of mechanical type, and an uncooled combustion chamber 4 having refractory brickwork. The refuse to be incinerated is charged at 0 and subsequently passes through the charging pit 2 to form a layer on the grate 3 at which point the refuse is ignited and burnt out in known manner, the non-combustible residues known as the clinker being discharged through the opening 5. Hot combustion gases leave the combustion chamber as illustrated at reference numeral 6 and are led through a convenient duct into the primary or heating side 7 of a vaporizer wherein the hot combustion gases yield their heat which is eventually expelled by natural or induced air currents into the atmosphere at reference numeral 8, the temperature of the combustion gases being not under some 570° F. Liquid sludge having a 92 percent water content is fed into the secondary side 10 of the vaporizer, while the dried sludge is withdrawn at reference number numeral 11 and conveyed by convenient means such as the endless belt conveyor 12 into the charging pit 2 of the incinerator, there to be comingled with the solid refuse. The comingling of the dried sludge with the solid refuse may, of course, take place elsewhere than in the charging pit, such as for example, in the refuse bunker.

The secondary water vapor which may be malodorous or otherwise affected, which results from the drying process in the secondary side 10 of the vaporizer is conducted at reference numeral 13 into the combustion chamber 4 of the incinerator wherein the secondary water vapor is superheated so as to destroy any noxious substances which it may contain and thus render the incineration process and operation odorless.

The general layout as depicted in FIG. 1 may be expanded, for example, by providing a two-stage vaporizer which may be advantageous and useful when the amount of sewage sludge is out of proportion to the amount of solid refuse.

Figure 2:
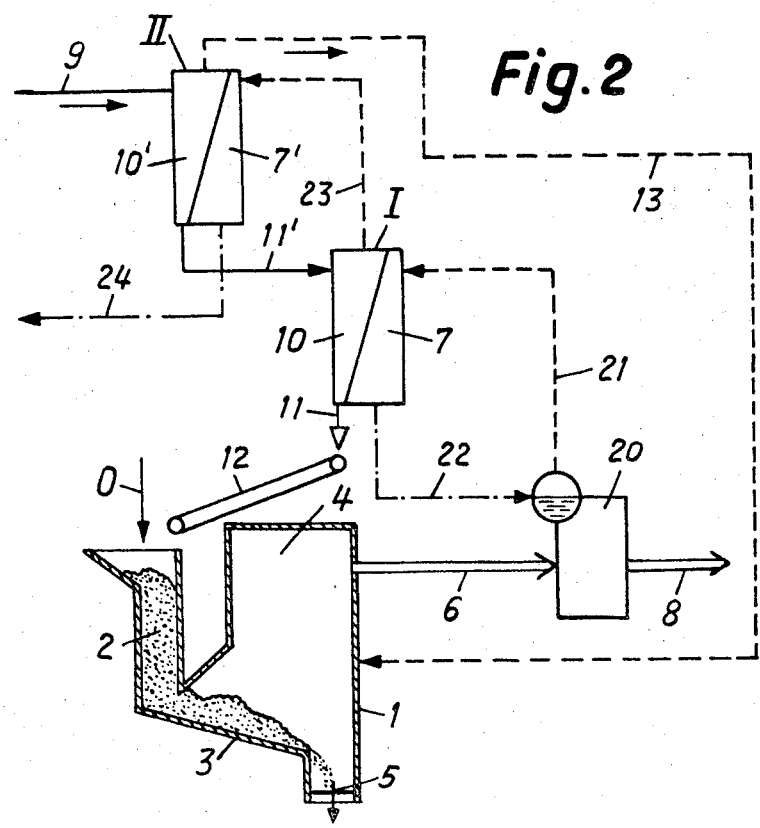
FIG. 2 illustrates a further operational arrangement for carrying out the inventive process wherein steam is utilized as an intermediate thermal agent to provide heat to a two-stage vaporizer for the liquid sewage sludge, the steam being generated in a boiler heated by the hot combustion gases effluent from an incinerator; and, FIG. 3 is a modification of the operational layout depicted in FIG. 2, utilizing two vaporizers connected in parallel on the sludge side of the arrangement and in series on the heating side.

Referring now to FIG. 2, an alternative arrangement for carrying out the inventive process is disclosed, such arrangement utilizing live steam, as the intermediate thermal agent. So as to better understand the inventive process, two-stage vaporization has been illustrated here. Such two-stage vaporization, however, is not a necessity. The two vaporizers depicted are connected in series on both the heating and the vaporizing sides thereof thereby reducing the steam consumption to half the amount of water vaporized. Additionally, the two vaporizers depicted are of nearly equal vaporizing capacity.

Here again, reference numerals 0, 1 through 5, have been utilized to designate the incinerator and its constituent parts, as above described. The hot combustion gases leaving the combustion chamber 4 at the location depicted by reference numeral 6 are conducted in a manner so as to heat a boiler 20 and thereafter are expelled at the location of reference numeral 8 into the atmosphere. Boiler 20 serves to generate saturated steam which is then conducted at reference numeral 21 into the primary or heating side of the vaporizer I. Here, the steam yields its latent heat and leaves the vaporizer I as condensate which is refed at 22 into the boiler 20, which thereby operates in a closed water-steam-water circuit, having the advantages inherent thereto.

The liquid sludge having 92 percent water content is fed into the secondary or vaporizing side 10' of the vaporizer II wherein above half of the water is vaporized such that at its discharge, the still liquid sewage sludge has a water content of about 85percent. In this state, the sewage sludge is fed into the secondary or vaporizing side 10 of the vaporizer I, wherein practically all of the remaining water is vaporized. The dried sludge is withdrawn at 11 and is conveyed at 12 into the incinerator as described above with reference to FIG. 1.

The secondary vapor resulting from the vaporization in the vaporizer I is conducted at 23 into the primary or heating side 7' of the vaporizer II as the heating agent from where it is discharged as condensate at 24. The secondary vapor effluent from the vaporizer II is conducted at 13 into the combustion chamber 4 of the incinerator 1 as discussed above.

Figure 3:
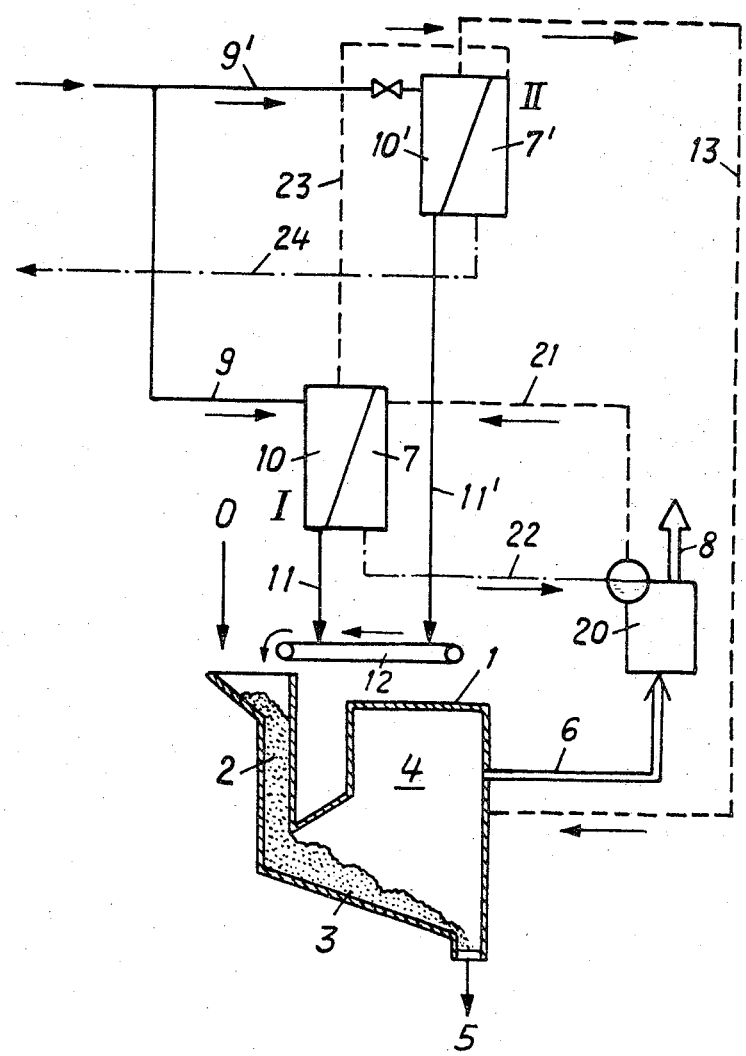

Referring now to FIG. 3, a further embodiment of a suitable operational layout for carrying out the inventive process is disclosed, like reference numerals in FIG. 3 referring to like parts as described hereinabove. With this arrangement, the hot combustion gases from the combustion chamber 4 of the incinerator 1 at 6 pass into a waste-heat boiler 20 and thereafter are discharged at 8, such discharge taking place either through natural air currents or by means of a suction effect such as would be achieved with a chimney. The water vapor circulation of the waste-heat boiler takes place in known manner from the boiler 20, along 21, through the primary side of a vaporizer I, through 22, and back to the boiler 20 thus releasing heat in the primary or heating side 7 of the vaporizer I. The sewage sludge is conducted into the secondary or drying sides 10 and 10' of vaporizer I and vaporizer II via 9 and 9', respectively, wherein the sewage sludge is dried. The dried sludge is withdrawn at 11 and 11', respectively, and is then transported via conveyor means 12 into the charging pit 2 of the incinerator 1.

The secondary water vapors resulting from the drying process in the secondary side 10 of vaporizer I are conducted to the primary or heating side 7' of vaporizer II as heated steam which is then condensed and subsequently carried off at 24 as condensate. The secondary vapors developed by the drying process in the secondary side 10' of vaporizer II are conducted into the combustion chamber 4 of the refuse incinerator 1 via 13 whereat such vapors are superheated and rendered odorless.

The schematic representations of arrangements suitable for carrying out the inventive process as discussed above are not exhaustive of the many arrangements which might so be utilized and such arrangements as depicted herein can easily be adapted to suit the particular circumstances of individual incineration operations.

I claim:

1. A process for the concomitant incineration of solid refuse and aqueous sewage sludge such as from community sewage treatment plants, said process comprising the steps of:
   incinerating the solid refuse;
   indirectly heating, exclusively thermally dewatering, and substantially completely drying the sewage sludge in a vaporizer utilizing only the hot combustion gases effluent from the incineration of the solid refuse;
   adding the dried sewage sludge to the solid refuse for concomitant incineration; and
   conducting secondary water vapor produced by the heating and substantially complete dewatering of the sewage sludge into the combustion chamber of the solid refuse incinerator, whereby the secondary water vapor is deodorized by superheating with the aid of the hot combustion gases resulting from the incineration of the solid refuse.

2. A process as defined in claim 1, wherein the hot combustion gases effluent from the incineration of the solid refuse are directly conducted to the vaporizer.

3. A process as defined in claim 1, wherein steam is generated in a boiler heated by the hot combustion gases effluent from the incineration of the solid refuse, the steam being passed to the vaporizer to heat and substantially completely dewater the sewage sludge, the boiler operating with a closed water/steam circuit.

4. A process as defined in claim 1, wherein the indirect heating and the substantially complete dewatering of the sewage sludge is carried out in a plurality of vaporizers, the secondary water vapor produced in one vaporizer being conducted to another vaporizer and being utilized as a heating agent therein.

5. An apparatus for the concomitant incineration of solid refuse and aqueous sewage sludge such as from community sewage treatment plants, said apparatus comprising a combustion chamber means for the incineration of solid refuse, said combustion chamber means having a charging shaft; a vaporizer means for dewatering and substantially completely drying sewage sludge, said vaporizer means having a sewage sludge inlet and outlet and a secondary water vapor outlet all in a secondary side thereof, and having an inlet and outlet in a primary, heating side thereof; said combustion chamber of said solid refuse incinerator being connected at least indirectly to said inlet in the primary, heating side of said vaporizer means by a duct means for the hot combustion gases emanating from said combustion chamber means; a conveyor means for conveying substantially completely dried sewage sludge from said sewage sludge outlet of said vaporizer means to said charging shaft of said combustion chamber means; means coupled to said sewage sludge inlet of said vaporizer means for depositing sewage sludge therein; and means coupled to said charging shaft for charging said combustion chamber with solid refuse.

6. An apparatus as defined in claim 5, wherein said duct means directly connects said combustion chamber for said solid refuse to said inlet in said primary, heating side of said vaporizer means, and further including means coupled between said secondary water vapor outlet of said vaporizer means and said combustion chamber means, whereby secondary water vapor produced in said vaporizer means by heating and substantially completely dewatering of said sewage sludge is deodorized by superheating.

7. An apparatus as defined in claim 5, further including a boiler means connected to said combustion chamber means by said duct means, said boiler means being connected to said inlet opening in said primary, heating side of said vaporizer means by a steam-line.

8. An apparatus as defined in claim 7, further including at least two vaporizer means, coupled together.

9. An apparatus as defined in claim 8, wherein said boiler means is connected to said inlet in the primary, heating side of a first vaporizer means by means of said steamline, and wherein the secondary water vapor outlet of the secondary side of said first vaporizer means is connected to the inlet in the primary, heating side of a second vaporizer means whereby the secondary water vapor produced in said first vaporizer means serves as a heating steam supply-line for said second vaporizer means; and wherein said secondary water vapor outlet in the secondary side of said second vaporizer means is coupled to said combustion chamber means by a return line for the secondary water vapor produced in said second vaporizer means by the heating and dewatering of the sewage sludge.

10. An apparatus as defined in claim 8, wherein said two vaporizer means are disposed in series with one another on their sewage sludge-sides, said sewage sludge outlet of said second vaporizer means being connected to said sewage sludge inlet of said first vaporizer means, and wherein said sewage sludge outlet of said first vaporizer means is connected to said conveyor means.

11. An apparatus as defined in claim 8, wherein said two vaporizer means are arranged in parallel with one another with respect to their sewage sludge-sides, and wherein each sewage sludge-outlet of said two vaporizer means is coupled to said conveyor means.